H. MESINGER.
SADDLE FOR MOTOR CYCLES.
APPLICATION FILED OCT. 21, 1914.
1,130,316.
Patented Mar. 2, 1915.
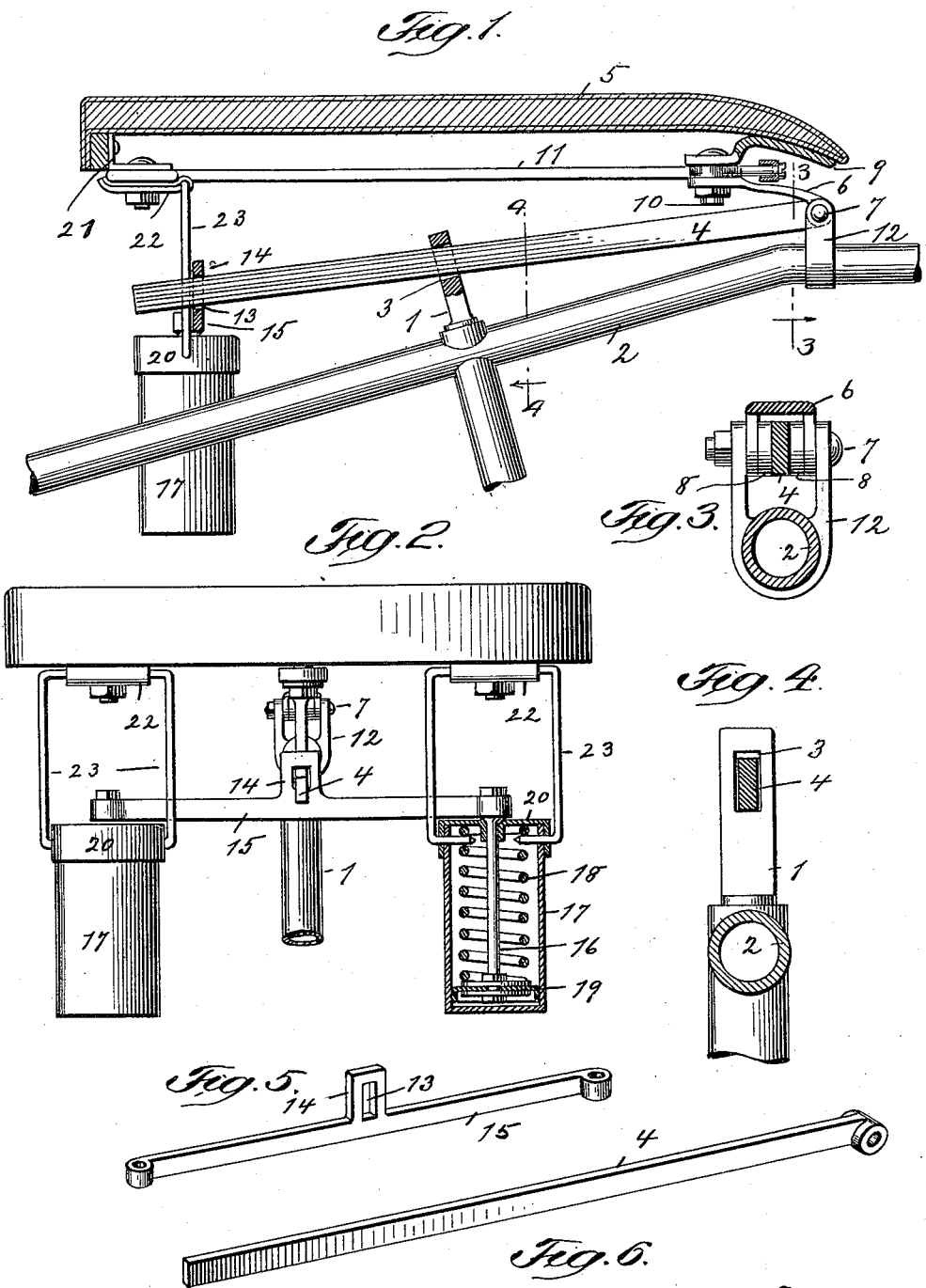

UNITED STATES PATENT OFFICE.

HENRY MESINGER, OF NEW YORK, N. Y.

SADDLE FOR MOTOR-CYCLES.

1,130,316.　　Specification of Letters Patent.　　Patented Mar. 2, 1915.

Application filed October 21, 1914. Serial No. 867,791.

*To all whom it may concern:*

Be it known that I, HENRY MESINGER, a citizen of the United States, and a resident of New York, in the county of Bronx and State of New York, have invented certain new and useful Improvements in Saddles for Motor-Cycles, of which the following is a specification.

This invention relates to a saddle adapted especially for motor cycles, and comprises more particularly novel and efficient means for securing the saddle to the cycle frame in a strong, simple and reliable manner.

In the accompanying drawing: Figure 1 is a longitudinal section, partly in elevation of a saddle embodying my invention; Fig. 2 a rear view partly in section thereof; Fig. 3, a cross section on line 3—3, Fig. 1; Fig. 4 a cross section on line 4—4 Fig. 1; Fig. 5 a detail of the transverse bar, and Fig. 6 a detail of the longitudinal bar.

The spring post 1 extending above the cycle frame 2, is provided with a squared eye 3, for the reception of a correspondingly shaped squared bar 4, that extends longitudinally beneath the axis of the saddle top 5. The forward end of bar 4, is hingedly connected to the front portion of said top 5 by means of an apertured bail 6, carrying a pin 7 that passes through the bar, a pair of washers 8 being fitted upon the pin between bail and bar. Bail 6 is shown to be secured to the saddle top by a clip 9, and bolt 10, the bolt likewise serving to sustain the forward end of the stay spring 11. Bar 4 besides being hingedly connected to the forward end of the saddle top is likewise hingedly connected to the forward end of cycle frame 2. This last named connection is effected by means of a yoke 12, that straddles frame 2, and has upwardly extending apertured shanks for the reception of pin 7, the shanks of the ycke being shown to embrace the shanks of bail 6. The rear end of bar 4, passes slidably through a squared eye 13, formed in the upwardly extending lug 14 of a bar 15, that extends transversely across the rear portion of saddle top 5. This transverse bar 15 is adapted to sustain the relatively fixed members of a back-spring or cushioning system, the relatively movable members of which are carried by the saddle top. The particular construction of this system does not form part of the present invention, and may be varied at pleasure, without departing from the spirit thereof. With the embodiment of the invention shown, bar 15 carries a pair of pistons 16, fitted in cylinders 17 and encompassed by spiral springs 18, interposed between the piston heads 19 and the heads 20 of cylinders 17. The cylinders are suspended from the cantle 21 of saddle top 5, by eyes 22, and hangers 23. During action, the cylinders 17 will participate in the vibrating movement of the seat, while the pistons 16 will remain relatively stationary, so that in this way the springs 18 will take up the jolts.

It will be seen that by the construction described, the connection between cycle frame and saddle is effected without the use of clamps and other devices which were heretofore generally employed; that the connecting parts are few in number and simple in construction, and that they form strong and reliable means for mounting the saddle.

I claim:

1. A saddle having a saddle top, a longitudinal bar pivoted at its forward end to said top and extending axially beneath the same, a transverse bar engaged by the rear end of the longitudinal bar, and members of a rear cushioning system secured to the transverse bar.

2. A saddle having a saddle top, a longitudinal bar pivoted at its forward end to the front of said top and extending axially beneath the same, a transverse bar engaged by the rear end of the longitudinal bar, relatively fixed members of a rear cushioning system secured to the transverse bar, and coacting relatively movable members of said system carried by the back of the saddle top.

3. A cycle having a frame and a seat post extending above said frame and having a squared eye, combined with a saddle having a top, a squared longitudinal bar pivoted at its forward end to said top and to the frame, said bar passing through the squared eye of the seat post, a back cushioning system, and means for connecting said system to the rear end of the bar.

4. A cycle having a frame and a seat post extending above said frame and having a squared eye, combined with a saddle having a top, a squared longitudinal bar pivoted at its forward end to said top and to the frame, said bar passing through the squared eye of the seat post, a transverse rear bar, having a square-eyed lug that is engaged by the longitudinal bar, and a back cushioning system, carried by the saddle top and by the transverse bar.

5. A cycle having a frame and a seat post extending above the frame and having a squared eye, combined with a saddle having a top, a bail pivoted to the top, a yoke embracing the forward end of the frame, a squared longitudinal bar passing through the squared eye and pivotally connected to the bail and yoke, a transverse rear bar having a squared eye that is engaged by the longitudinal bar, and a back cushioning system secured to the rear bar.

HENRY MESINGER.

Witnesses:
FRANK V. BRIESEN,
ARTHUR E. ZUMPE.

Copies of this patent may be obtained for five cents each, by addressing the "Commissioner of Patents, Washington, D. C."